Sept. 23, 1969   W. E. HUMPHREY   3,468,595
OPTICAL STABILIZATION BY REFLECTING MEANS
Filed Aug. 29, 1966   2 Sheets-Sheet 1

INVENTOR
WILLIAM E. HUMPHREY
BY
Lippincott, Ralls & Hendrickson
ATTORNEYS

Sept. 23, 1969    W. E. HUMPHREY    3,468,595
OPTICAL STABILIZATION BY REFLECTING MEANS
Filed Aug. 29, 1966    2 Sheets-Sheet 2
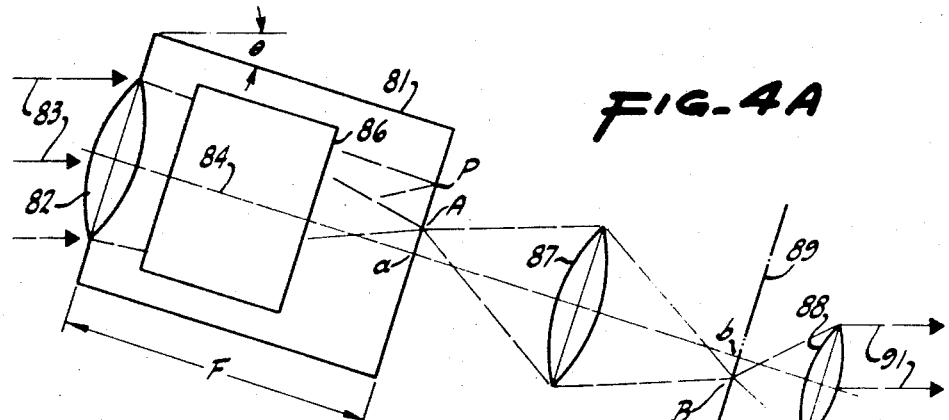
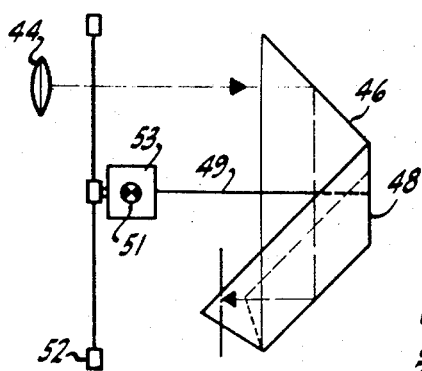
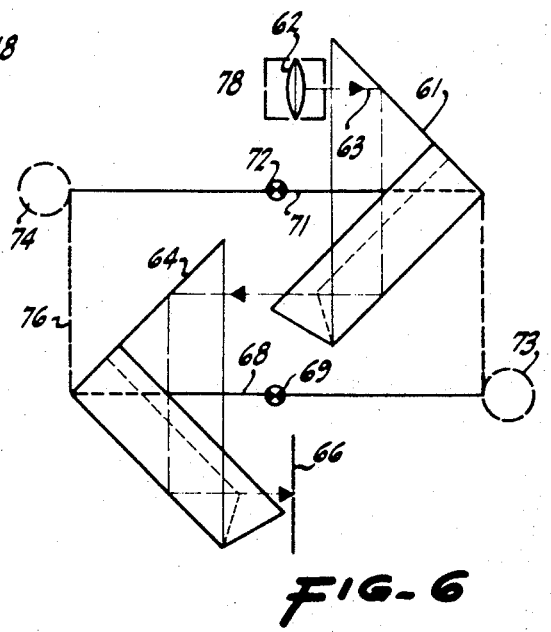
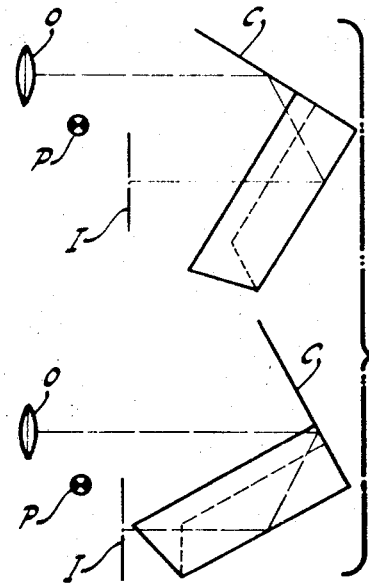
INVENTOR.
WILLIAM E. HUMPHREY
BY
Lippincott, Ralph & Henderson
ATTORNEYS

United States Patent Office 3,468,595
Patented Sept. 23, 1969

3,468,595
OPTICAL STABILIZATION BY REFLECTING MEANS
William E. Humphrey, Berkeley, Calif., assignor to Optical Research and Development Corporation, Oakland, Calif., a corporation of California
Filed Aug. 29, 1966, Ser. No. 575,624
Int. Cl. G02b 23/10
U.S. Cl. 350—16
12 Claims

ABSTRACT OF THE DISCLOSURE

An optical stabilizer including object lens for focusing received light, a plane for displaying an image of the focused light, and at least one stabilized reflecting and retrodirecting corner cube reflecting surface therebetween. The corner cube reflecting surface is pivoted about gimbal mountings along an arm located a distance from the mirrors to the focal length of the objective lens so as to stabilize the image by intercepting and retrodirecting the focused rays of the viewed image at all angles of accidental angular deviation. Variations of this pivot distance are disclosed for eye stabilized viewing.

---

Figure 1:
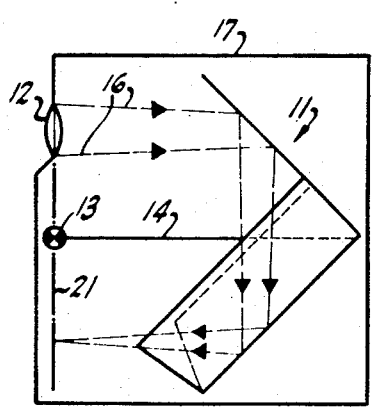

The present invention relates in general to the stabilization of optical systems against small-angle deviations thereof from a desired line-of-sight, and is more particularly directed to accidental-motion compensation for any and all types of optical systems through the use of image reflection from plane surfaces that are inertially stabilized in space.

There have been developed a variety of optical compensation methods and apparatus primarily directed to levelling instruments. Although certain of these prior art advances have proven highly advantageous, they are primarily limited in application to operation in a single vertical plane. There have additionally been developed certain stabilized systems for accidental-motion compensation, as, for example, refractive systems wherein one portion of a lens system is stabilized so that motion of other portions establishes a corrective prism to remove error angles. Alternative approaches to the problem include electronic or electrical compensation wherein light is represented by electron beams that are deflected to compensate for accidental motion, and electro-mechanical servo systems in which misalignments are sensed and corrective forces are applied.

Figure 2:
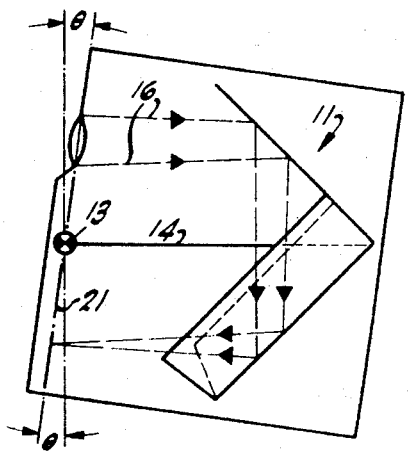
Figure 3:
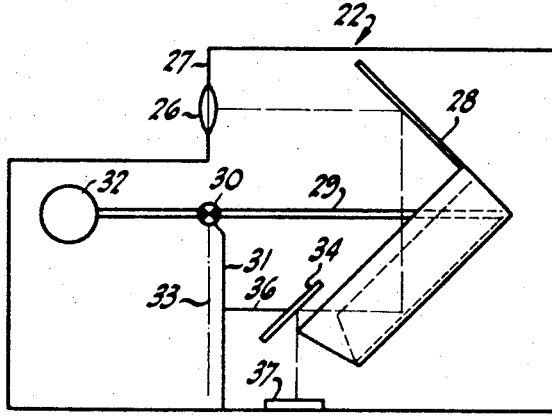
Figure 4:
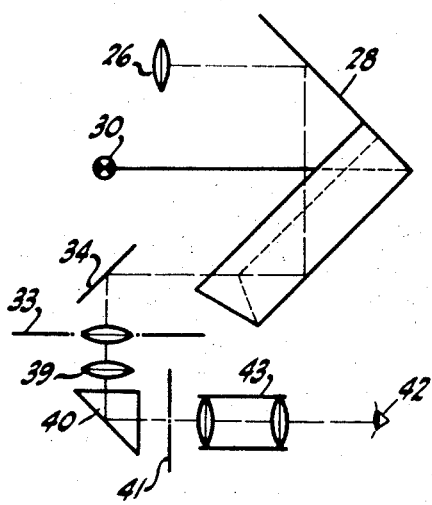

The present invention has much the same objects as prior art accidental-motion compensators; however, the invention hereof is materially simplified thereof and proceeds in an alternative manner to accomplish these objectives. The present invention does produce a very small shift, or displacement of a stabilized image, so that the image lies in a slightly displaced plane parallel to the original. Consequently, the present invention may be considered as a displacement system, as opposed to stabilization systems of the deflection type wherein a compensating motion of the image is produced by deflecting the rays through a small angle at some point between the objective and image plane with a resultant slight tilting of the stabilized image. The present invention provides for mounting of a multiple-reflection element comprising plane surfaces, so that it maintains its orientation in space. This may be accomplished in a variety of ways; however, a simple manner of mounting is to merely balance a reflective element of substantial inertia upon a substantially frictionless two- or three-degree-of-freedom pivot, so that accidental movement or vibration of a housing about same does not impart angular motion to the reflective element. By the direction of light rays of an image onto the reflective element through an objective lens system that is subject to accidental motion, there is produced at the folded focal length of the objective an image stabilized with respect to the housing. A large number of variations of the present invention are possible, not only with regard to differences that are required or desirable in connection with alternative types of optical devices, but, also, more basically, in the actually reflective element. There is herein set forth, as an example of the present invention, an embodiment employing cube prisms or cube mirrors, as later defined, together with various alternatives thereof, as may be employed in various fields of optics. The cube mirror system of the present invention is illustrated in the accompanying drawings wherein:

FIGURE 1 is a schematic representative of a stabilized optical system in accordance with the invention;
FIGURE 2 is a view similar to FIGURE 1, but with portions of the system slightly deviated from the line-of-sight direction thereof;
FIGURE 3 is a longitudinal sectional view through a camera embodying the stabilized optical system of the invention;
FIGURE 4 is a schematic view of the stabilized optical system as embodied in a telescope;
FIGURE 4A is a diagrammatic representation of stabilization modification required for optical-viewing devices.
FIGURE 5 is a schematic view of a modified form of the stabilized optical system employing a gyroscope;
FIGURE 6 is a schematic representation of a double-mirror arrangement; and,
FIGURE 7 is a generalized showing of equivalent angularly displaced embodiments of the invention.

Considering now the present invention in some detail and referring to FIGURES 1 and 2, there will be seen to be provided a stabilized optical system for stabilizing large-field images by means of plane reflective surfaces. More particularly, the system is shown to include a cube mirror 11 and an objective lens 12, the lens being fixedly mounted within the housing of an optical instrument while the mirror is particularly mounted in the housing to maintain its "orientation" independently of housing motions. At this point it is noted that the mirror hereof is adapted to remain in a line-of-sight position, and is stabilized against "pitch" and "yaw," but not necessarily against "roll" about the optic axis. In the following description the terms "angular orientation" and "angular deflection" are taken to refer to angles with respect to the axis of an original line-of-sight and not rotations about such axis. "Cube mirror" is herein defined as any optical arrangement formed from three mutually perpendicular reflecting planes meeting to form the corner of a cube and, thus includes a cube prism, combinations of plane and roof mirrors, combinations of right angle, and roof prisms and the like, in addition to a conventional cube mirror comprised of three connected mutually perpendicular planar mirror surfaces. In the drawings the convention of FIGURE 1 is employed through desire to depict a cube mirror rather than employing a multiplicity of views therefor. Irrespective of the particular configurations of the cube mirror 11, same has the important optical properties of reflecting light rays back along their original direction of incidence, usually with optical displacement, and rotating the image 180° compared to reflection from a single plane mirror. It is particularly noted that the mirror may be rotated about its apex without changing the optics of the system; and further, that a given translation of the apex results in twice that translation of the image formed by the objective 12 beamed into the mirrors. In effect, the mirrors reverse the direction of the light rays and reflect the spatial position of the rays about the apex of the intersecting mirrors.

With regard to the mounting of the cube mirror 11, the mounting is such as to permit the apex of the mirror to pivot relative to the housing of the optical instrument about the pivot 13. The pivot point lies on a line parallel to the axis of the objective and passes through the mirror apex. In accordance with the present invention, the pivot distance from the mirror apex is equal to $f/2$, where $f$ is the focal length of the objective lens 12. With the orientation of the mirror maintained in an original direction, assume the housing of the optical instrument deviates from such direction by an angle $\theta$. In other words, the housing may be considered to pivot about the pivot point 13 through the angle $\theta$ relative to the apex of the mirror. The image is displaced relative to the housing by $f\theta$; however, the mirror introduces a compensation translation given by the relative translation of the apex about the pivot point 13. This compensating translation is given by $(f/2)\theta \times 2$ or $f\theta$. The two translations of the image exactly cancel, and the image is thus stable with respect to the housing.

The stabilizing effect of the present invention may be best understood by considering the system illustrated in FIGURE 1 with the objective lens 12 directed toward a subject to be filmed. The optic axis of the objective is considered to be parallel to a line 14 between the pivot point 13 and apex of the cube mirror 11. A bundle of rays 16 from the objective lens converges, as illustrated, so as to be reflected by the mirror 11 back toward the objective, but displaced therefrom into focus at a stabilized image plane 21. This image plane is stabilized with respect to a housing or the like that also mounts the objective lens, and, photographic film may be positioned at the image plane. Alternatively, it is possible for additional optics to be employed for viewing this image plane to redirect or operate upon the stabilized image as described below.

Now considering an instrument housing 17 mounting the objective 12 to be deviated from its original line-of-sight direction by a small angle $\theta$, as shown in FIGURE 2. The cube mirror 11 substantially maintains its original angular orientation independently of the angular deviation of the housing, because of the inertia of the mirror and substantially frictionless mounting thereof. The converging bundle of light rays from the objective 12 retain their same relationship to the line 14 as in the previous example, and are reflected from the mirror to converge at the image plane 21 as previously. It is to be appreciated that the objective and stabilized image plane 21 both move with the housing while the mirror 11 maintains its original angular orientation. It will, thus, be seen that irrespective of angular deviations of the instrument housing from an original line-of-sight direction, a stable image is provided at the plane 21. It is noted that for small angular deviations the image plane is actually displaced parallel to itself an amount $f\theta^2/2$, however, for small angles this is negligible. Inasmuch as any further optics that may be provided in a camera, or the like, are fixed relative to the housing, and, therefore, relative to the image plane, the image viewed by such optics and transmitted thereby is also stable with respect to the housing. Under certain circumstances discussed below, this condition is intentionally varied for optical-viewing devices.

There is illustrated in FIGURE 3 a line diagram of a stabilized optical system in accordance with the present invention as being embodied in a camera 22. This camera includes a housing 23 provided with an objective lens 26 that is fixedly mounted in a front wall 27 thereof. Consequently, the objective lens 26 moves with the housing relative to an original line-of-sight. Within the housing 23 there is mounted a cube mirror 28, and, in accordance with the present invention, this mirror is mounted to maintain its original angular orientation independently of the angular deviations of the housing from an original line-of-sight. Although such stabilized mounting of mirror may be accomplished in a variety of ways, the illustrated embodiment employs a simple, pure inertially stabilized arrangement. In this regard there is illustrated an elongated yoke 29 secured to the apex of the mirror 28 and extending from the front thereof. The yoke 29 is mounted in the housing by means of suitable pivot means which permit free pivotal movement of the yoke about any axis normal to the yoke axis. Although various alternatives are possible with regard to this mounting, the pivot means is preferably provided as gimbal mountings, generally indicated as a pivot 30. While the simple theory of the present invention presupposes three-axis pivots, in practice there is generally employed a two-axis gimbal joint with such gimbal axes being perpendicular to the yoke axis. It is also noted that the first moments of all masses on the yoke are to be substantially equal to zero about axes through the pivot. Additionally, it is required, although not obviously so, that all moments of inertia about any axis through the pivot point be substantially equal. The foregoing is required to prevent progressive deflections of systems without a gyroscope; however, for gyro stabilization, the moments of inertia about axes normal to the optic axis should be minimized in comparison to moments of inertia of the gyro about its axis to minimize nutational effects. Other types of pivot mountings, such as compensated flexure bearings, may also be used. The pivot mounts the yoke at a point intermediate its ends, and a counterweight 32 is secured to the free end of the yoke to balance the mirror 28. The distance between the pivot 30 and apex of the cube mirror system is selected to be half the focal length of the lens 26, in accordance with the considerations discussed previously. It is important to note at this point that the pivot arm for the cube mirror is to have a length equal to one-half the focal length of the objective, but that the physical location of the pivot point, or pivot axes, may be positioned as desired through the use of various stratagems, such as the one illustrated in FIGURE 5 and discussed later. By virtue of the above-noted mountings and balance, the mirror position remains in fixed alignment despite movements of the housing. The system operates in the manner previously described to produce a stable image at a plane 33. A 90° reflecting mirror 34 is mounted adjacent the cube mirror 28 as by means of support 36 which is fixedly secured to the housing. The mirror 34 reflects the rays from the stabilizing mirror 28 into focus at a film gate 37 which is also fixedly secured to the housing. Thus, since the mirror 34 and gate 37 are fixed relative to the housing, such elements move with the stabilized image plane during the movement of the housing. The stabilized image is thus stably focused upon film in the film gate to produce a stable image thereon.

FIGURE 4 schematically illustrates the applicability of the stabilized optical system to a telescope, binoculars, or the like. The arrangement is generally similar to that of the camera illustrated in FIGURE 3, and, therefore, like elements are designated by like reference numerals. In the present embodiment, the mirror 34 deflects the light rays downward to focus at the stable image plane 33, and a field lens 38 may be inserted to collect the light. An inverting lens 39 directs light onto a roof prism 40 which deflects the light 90°, so that a stable image appears at the plane 41. This stable image at the plane 41 is viewed by the eye 42 of an observer through an ocular 43. Thus, the exit direction of the stabilized light may be made the same as the incident direction. It is to be particularly noted that somewhat less than one-hundred-percent stabilization is required for optical viewing devices, such as telescopes and binoculars. Although it is required for cameras that the position of an image on a film plane be maintained constant for accidental motions of the case or housing, this situation does not produce desired stabilization for viewing devices. This may be best understood by reference to FIGURE 4A which schematically illustrates the differences existing between a camera, for example, and a telescope wherein accidental-motion compensation is incorporated. Referring to FIGURE 4A, it will be seen that a case 81, having an objective lens or lens system 82, is shown to be tilted at an angle $\theta$ to horizontal. Parallel entering light rays 83, assumed to come from a star, or the like, are shown to be directed horizontally into the objective 82; and, in camera applications it is required for stabilization that these rays be focused at a point $a$ on the axis 84 of the case at the focal plane 85 of the objective. In the absence of stabilization, tilting of the case 81 would result in a shift of this focal point to a point P in this plane 85. One-hundred-percent stabilization, as discussed above in connection with FIGURES 1 to 3, produces the required shift of image location to the point $a$ on axis 84 for camera applications. Thus a film gate located at plane 85 will have an image stabilized thereon, with respect to the case, by the stabilizer illustrated only as a "black box" 86. With the objective having a focal length F, the stabilizer for camera applications serves to move the image an amount $Pa$ or $-F\theta$ to counteract the image shift $+F\theta$ produced by tilting of the case.

With the simple erecting telescope of FIGURE 4A, including a one-to-one inverter 87 and eyepiece 88 fixed to the case, the apparent position of the star viewed by the telescope would be shifted by the angle $\theta$ if one-hundred-percent stabilization, or "camera stabilization," were employed. Although this situation may be preferable to the uncompensated situation, it yet fails to provide desired stabilization for the telescope. Actually, it is necessary to shift the image at plane 85 to some point A between the uncompensated position P and one-hundred-percent compensated position $a$. This will, then, result in the inverting lens 87 positioning the image in the focal plane 89 of the eyepiece at a point B which is displaced from a point $b$ at the intersection of this focal plane and the axis of the optics. Considering the eyepiece 88 to have a focal length $f$, it is possible, then, to derive the correct stabilization modification necessary for exit light rays 91 to leave the eyepiece parallel to the incoming light rays 83 at the objective. This is the situation required for "telescope" stabilization.

Exit light rays 91 will emerge from the eyepiece parallel to the original light rays 83 from a star, or the like, if $bB=f\theta$. Considering that the inverter lens 87 is a single power lens, then $bB=-aA$, i.e., the displacement at the focal plane 89 is equal to, and the reverse of, the displacement at the focal plane 85. Disregarding algebraic signs for the moment, it will be seen that inasmuch as $bB=f\theta$, then $aA=f\theta$. In order to correctly position the image at the point A, it is necessary for the stabilizer to shift the image by an amount PA, rather than an amount $Pa.\theta$ In order to determine the fraction of one-hundred-percent stabilization required for this example, the above-noted distances of image shift are thus divided, i.e., $$PA/Pa = \frac{Pa-Aa}{Pa}$$

It will be appreciated that $Pa=F\theta$ for small angles; and likewise, that, as noted above, $Aa=f\theta$, so the fraction of stabilization required may be rewritten as $$PA/Pa=1-f/F$$

The magnification $M=F/f$; and, thus, the faction of camera stabilization required for the erecting telescope discussed herein is $$\left(1-\frac{1}{M}\right)$$

From similar considerations it may be determined that for an inverting telescope, the fraction of camera stabilization required is $$\left(1+\frac{1}{M}\right)$$

and, thus, in the generalized case the correction factor is $$\left(1 \pm \frac{1}{M}\right)$$

In the present invention the correction factor is preferably employed by modifying the pivot arm of the cube mirror; and, thus, for an erecting telescope, or binoculars, having a single yoke, the total length of yoke is made equal in length to $$f/2\left(1-\frac{1}{M}\right)$$

for an erecting system. More generally, the total length of pivot arm(s) is reduced by the factor $$\left(1-\frac{1}{M}\right)$$

for erecting systems.

Although the embodiments of the stabilized optical system hereinbefore described have employed purely inertial stabilization utilizing low-friction pivots and a counterbalance, and it is to be noted that gyroscope stabilization may also be employed, it is possible to employ a stationary-mounted gyroscope and some type of torquer; although it is preferable to utilize a "free gyro" that can be "erected" to follow a changing housing axis. In this respect there is illustrated in FIGURE 5 a stabilized optical system employing a gyro stabilizer. The system schematically illustrated in FIGURE 5 includes an objective lens 44 and a cube mirror 46. In this embodiment the apex of the mirror is illustrated to be cut-away or removed, and this may be done in any circumstance wherein only a limited reflective surface is required at the mirror. Actually, the apex portion of the mirror is unused in many instances, so that removal thereof does not impair the optics of the system. It is to be further noted in this respect that the pivot arm for the cube mirror, or individual mirrors forming the equivalent thereof, is still taken from the intersection of the planes of the reflective surfaces, i.e., what would have been the apex of a cube mirror. In this instance the reflective surfaces are secured by spokes, or the like, 48 to a yoke 49 pivotally mounted at a pivot point 51, as by means of gimbals, flexure bearings, or the like. In this embodiment a gyroscope rotor 52 is provided with a relatively heavy rim portion mounted by thin, radial spokes to a central hub and rotated by a motor 53 that may be mounted at the pivot point 51. The entire assembly of mirror 46, yoke 49, gyroscope rotor 52, and drive motor 53 will, thus, be seen to be pivotally mounted. The motor 53 may be employed only to rotate the gyroscope rotor, or, alternatively, it may also be employed to rotate the mirror by rotating the yoke 49. It is to be appreciated that rotation of the cube mirror does not alter the optics of the stabilizer or acicdental-motion compensator. It is to be further noted that the light from objective 44 passes through the rotating spokes of the gyro rotor which, then, acts only to slightly reduce the amount of light transmitted; and does not otherwise interfer with the optics of the system. It is to be further appreciated that a wide variety of means may be employed to apply a desired torque to the gyroscope rotor in order to precess the compensator, so that the axis thereof follows a changing optical axis for intentional traverse, or panning, of an optical device containing the accidental-motion compensator. It is possible to utilize precessors having tailored characteristics, so that the gyroscope establishes desired inertial stabilization for a limited degree of angular displacement of the housing from an original line-of-sight, and, then, erects the system so as to follow a changing line-of-sight for greater degrees of angular deflection.

Further, with regard to FIGURE 5, it is noted that the gyroscope drive motor 53 need not be pivotally mounted, for it is possible to utilize a stationary-mounted drive motor and some type of universal joint. For many applications of the present invention, the utilization of gyroscope stabilization is highly advantageous, particularly in view of the ease of controlled precession thereof. While optical devices, such as still cameras, or the like, are normally not traversed during use, many other optical devices, such as motion picture cameras and viewing devices, are intended to be used while in motion, so as to provide a panoramic image, and in these instances controlled gyroscope precession is highly advantageous.

It is to be noted, that although the present invention is herein described in connection with a cube mirror, it is often preferable to provide the equivalent of a cube mirror in the form of three plane mirrors. This has the advantage of minimizing the difficulties in alignment of cube mirror surfaces, since the bundle of converging light rays from the objective strikes three single mirror reflective surfaces in succession; and slight misalignment of such surfaces is not nearly as critical as in the case of a single mirror and a roof mirror, or of a cube mirror. Furthermore, the utilization of three plane mirrors in mutually perpendicular relationship allows variation in positioning of the individual reflective surfaces, so as to simplify positioning of the actual pivot point.

It is to be appreciated that innumerable variations of the present invention are possible, as described in part above. An additional and interesting combination, in accordance with the present invention, is the utilization of a pair of cube mirrors, or the like, such as illustrated in FIGURE 6. Referring to the illustration of this embodiment of the present invention, it is seen that there is provided a first cube mirror 61 having light directed thereon from an objective 62, such that the light follows a general path as denominated by 63, and is reflected back toward the objective from the mirror 61. A second cube mirror 64 is positioned to intercept light reflected from the mriror 61, and, thus, to redirect it to a stabilized image plane 66 for camera stabilization. In accordance with the present invention, either one or both of the cube mirrors 61 and 64 may be inertially stabilized. Thus, for example, the mirror 61 may be fixed with respect to the objective 62 and housing containing same, while the second mirror 64 is mounted by a bar, or the like, 68 extending from the apex thereof through a substantially frictionless pivot 69. In such an arrangement, the pivot 69 is spaced from the apex of the compensating mirror 64 a distance equal to the focal length of the objective divided by two; and, consequently, produces a stable, inverted image at the plane 66 in the same general manner as described above in connection with FIGURES 1 and 2. Of course, an inverting lens may be employed in the system to return the image to upright position; and, it is noted that for this particular embodiment of the invention, the light leaves the compensating system in the same direction that it arrives.

It is also possible to mount both mirrors 61 and 64 for pivoting, and, in this instance, the mirror 61 is mounted by a bar, or yoke, 71 extending from the apex of the mirror through a substantially frictionless pivot 72, so as to be freely movable thereabout. It is, of course, to be appreciated that each pivotally-mounted mirror must be balanced upon the pivot thereof; and this may be accomplished by the utilization of counterweights 73 and 74 in the manner described above; or, alternatively, it is possible to employ each of the mirrors as the counterweight for the other by utilizing linkage generally indicated by the dashed lines 76 in FIGURE 6. In all cases, the total pivot arm for all pivoted mirrors is equal to one-half the focal length of the objective; and the illustration of FIGURE 6 shows the separate pivot arms 68 and 71 as being equal; and, thus, each having a length equal to one-quarter of the focal length of the objective. The more generalized situation is one in which the total length of the pivot arms is equal to one-half the focal length of the objective, regardless the number of pivot arms employed; and, thus, it will be seen that different amounts of compensation may be provided by different mirror combinations. In the camera stabilizer illustrated in FIGURE 6 the two pivot arms for the mirrors 61 and 64 may have lengths equal to $k(f/2)$ and $(1-k)(f/2)$. This particular relationship of unequal pivot arms may be advantageously employed in the circumstances wherein one gimbal system is carrying a gyroscope flywheel and an additional degree of freedom is required for balancing of the entire system.

It is to be noted that the appartus or system of FIGURE 6 may be folded to any desired angle along the uncompensated optic axis between the two compensating mirrors 61 and 64. It is also possible with double-mirror compensation, as illustrated, to employ one of the mirrors for optical stablization and the other for inserting translational image corrections into the optical system. It will, of course, be appreciated that the system illustrated in FIGURE 6 is directed to camera stablization, and that for telescope, or binocular, stablization, the sum of the pivot arm lengths is equal to $$f/2\left(1 \pm \frac{1}{M}\right)$$

wherein the sign conventions are the same as those previously described. For optical-viewing instruments, such as telescopes or binoculars, the accidental-motion compensator does not provide one-hundred-percent compensation, as required for camera applications, but, instead, incorporates the foregoing correction to direct parallel light rays from an eyepiece in parallelism with incoming light rays to produce an image which is stablized with respect to the eye of the viewer. In the foregoing and following description of this particular embodiment of the present invention, camera stabilization is presupposed; and the necessary correction for telescopes, or the like, may be made in accordance with the above-noted teaching.

With regard to practical, physical systems employing the present invention, and again referring to FIGURE 6, it is noted that under certain circumstances it may be desirable to displace the image plane 66 further away from the compensating mirrors in order to provide space for additional optical elements. In practice it has been found that rather crowded conditions may exist in the central portion of an optical compensating system of the present type; and this may be relieved by employing, for example, an inverse telescopic lens 78 as an objective close to the mirror 61. Such a lens serves to displace the effective position of the objective into the stablized optics, and, thus, to displace the stablized image plane 66 away from the compensating mirrors. Another possibility in this respect is the utilization of the so-called "Barlow" lens on the optical axis immediately followng the stabilizing mirrors, inasmuch as this type of lens also serves to increase the effective focal length after stabilization; and, thus again displace the image plane 66.

It is to be appreciated that the angular orientation of the cube mirror, or mirrors, of the present invention does not affect the optics thereof. Likewise, rotation of the cube mirror of the present invention about any axis through the apex does not alter the optics of the invention. In order to emphasize the independence of this invention from particular angular orientations, there is illustrated in FIGURE 7 a generalized showing of variable angularly displaced cube mirrors. In FIGURE 7 the following conventions are employed: O identifies the objecive lens; C identifies the cube mirror; P identifies the pivot point; and, I identifies the stablized image plane. It will be seen that tilting of the cube mirror C, either in the direction illustrated in FIGURE 7A or 7B and in any other plane, does not deleteriously affect the stabilization afforded by the invention. This partcular property of the present invention is particularly advantageous as regards original required alignment of individual members of the reflecting mirror system; and, also, in the construction of particular optical devices wherein space requirements may be more readily met by angular displacement of the cube mirror.

A further modification of the double mirror system arrangement is worthy of special note. The foregoing limitation upon location of the pivot points for the two-system embodiment of FIGURE 6 is generally applicable in all cases; however, it is possible to insert a negative lens, or lens system, between the mirror systems, so that the pivot arm of the second system would then be modified in accordance with the changed focal length $f$. Also it is possible for the two pivot axes for each mirror system to be separated, with the general limitation still being that the sum of the pivot arms for both horizontal and vertical pivot axes are equal. Certain gimbal systems having displaced horizontal and vertical axes are often advantageous, such as one having a frame carrying two horizontal axes in the same plane and an offset vertical pivot axis mounting the frame. Thus, vertical and horizontal (or perpendicular) pivot axes for each mirror system need not coincide or cross at a point, but the pivot arm limitations still apply for each combination of parallel axes.

There has been described above a plurality of embodiments of the present invention with brief descriptions of each; and, it is to be appreciated that the basic criteria of inertial stabilization in space of at least three plane reflecting surfaces extends to all embodiments of the invention. In view of the multiplicity of variations and alternatives possible in accordance with the present invention, it is manifestly impossible to illustrate each; and, thus, it is expected that those skilled in the art will appreciate the generally applicable theory, so as to readily employ the invention in any type of optical instrument wherein accidental-motion compensation is desirable. It is not intended to limit the present invention to the exact terms of the foregoing description or details of the accompanying illustrations, but, instead reference is made to the appended claims for a precise definition of the true scope of this invention.

What is claimed is:

1. An optical stabilization system for stabilizing optical systems against accidental motion producing angular deviations from an original line-of-sight comprising an objective lens having a predetemined focal length, means defining a plurality of at least three plane reflecting surfaces having an optical apex, means mounting said surfaces in position for at least one to intercept light from said objective lens and moving said surfaces about at least two axes a distance of lateral excursion relative to the optical axis of the objective lens equal to radial movement of said reflecting surfaces in an arc about a pivot point spaced a distance substantially equal to one-half the focal length of said objective lens from the optical apex of said surfaces, means connected to said surface-defining means for balancing the latter on said mounting and establishing a high moment of inertia to the combination for inertial stabilization of the orientation of the surfaces with respect to an original line-of-sight, and means disposed at an optical path length from the objective equal to the focal length of the objective for receiving a reflected stabilized image from said objective, said latter means and said objective lens mounted for common angular movement.

2. The system of claim 1 in which the means connected to said surface-defining means comprises a rotating mass.

3. The system of claim 1 further defined by the means connected to said surface-defining means comprising a mass rotatable about an axis parallel to a desired line-of-sight in space and parallel to a line between the pivot point and the point defined by the intersection of the three planes of the reflecting surfaces.

4. The system of claim 1 further defined by the mounting means comprising a pair of approximately mutually perpendicular gimbals, said means connected to said surface-defining means further comprising a counterweight connected by a yoke extending through said pivot point to said surface-defining means in line with a common point in the planes of said surfaces, and the moments of inertia of the yoke and means connected thereto about all axes through the pivot point being substantially equal.

5. The system of claim 1 further defined by said means defining reflecting surfaces comprising a cube mirror.

6. The system of claim 1 further defined by said means defining reflecting surfaces comprising a single unit having three mutually perpendicular reflecting surfaces with the planes thereof intersecting at a common point.

7. The system of claim 1 further defined by a plurality of means with each defining three mutually perpendicular reflecting surfaces with a point of intersection of the planes of the surfaces of each means, said means being disposed to reflect light in a continuous path from the objective to an image plane, each of said means being inertially balanced upon pivot arms having a combined length of one-half the objective focal length from said points to the pivot points.

8. The system of claim 2 further defined by the displacement of said point from said pivot being equal to one-half the objective focal length times the factor $$\left(1 \pm \frac{1}{M}\right)$$

for a viewing device wherein M is the magnification of the optical system and the plus sign is employed for inverted images systems and the minus sign for erect image systems.

9. The system of claim 9 further defined by the combined length of pivot arms being equal to one-half the objective focal length multiplied by the factor $$\left(1 \pm \frac{1}{M}\right)$$

wherein M is the magnification of the optical system and the plus sign is employed for an inverted image-viewing device and the minus sign for an erect image-viewing device.

10. An optical stabilizer comprising an objective lens system having a predetermined focal length, a plane for displaying an image formed by said objective lens system, means mounting said plane and said objective lens system for common angular movement, reflective means having at least two connected mutually perpendicular reflecting surfaces, said reflective means mounted with one reflecting surface positioned to receive light from said objective lens and the other surface positioned to reflect light from the first of said surfaces to said focal plane, gimbal mounting means for said reflective means, inertial means connected to said mounting means maintaining said reflective means in a fixed angular position in space when said lens and focal plane are angularly moved in space, said gimbal means providing transverse relative movement of said reflective means relative to the optical axis of the objective lens system when said objective lens system and plane are angularly moved.

11. An optical stabilizer according to claim 10 and wherein said reflective means comprises a corner cube.

12. An optical stabilizer according to claim 10 and wherein said reflective means comprises a pair of elements, each of said pair having at least two connected, mutually perpendicular reflecting surfaces.

References Cited

UNITED STATES PATENTS

| | | |
|---|---|---|
| 1,628,777 | 5/1927 | Henderson. |
| 1,639,229 | 8/1927 | Luckey. |
| 2,571,937 | 10/1951 | Peck. |
| 2,779,231 | 1/1957 | Drodofsky _____ 350—16 X |
| 2,959,088 | 11/1960 | Rantsch _____ 350—16 X |
| 2,741,940 | 4/1956 | Drodofsky _____ 350—16 X |
| 3,158,674 | 11/1964 | Woodson. |
| 2,944,783 | 7/1960 | MacLeish _____ 350—16 |

FOREIGN PATENTS

| | | |
|---|---|---|
| 590,453 | 5/1957 | Italy. |
| 1,386,114 | 12/1964 | Germany. |
| 1,015,916 | 1/1966 | Great Britain. |

DAVID SCHONBERG, Primary Examiner

PAUL R. GILLIAM, Assistant Examiner

U.S. Cl. X.R.

356—250